(12) United States Patent
Rohloff et al.

(10) Patent No.: US 12,417,295 B2
(45) Date of Patent: Sep. 16, 2025

(54) SYSTEM AND METHOD FOR SECURELY EVALUATING RISK OVER ENCRYPTED DATA

(71) Applicant: Duality Technologies, Inc., Maplewood, NJ (US)

(72) Inventors: Kurt Rohloff, West Orange, NJ (US); Yuriy Polyakov, Fair Lawn, NJ (US)

(73) Assignee: Duality Technologies, Inc., Maplewood, NJ (US)

(*) Notice: Subject to any disclaimer, the term of this patent is extended or adjusted under 35 U.S.C. 154(b) by 235 days.

(21) Appl. No.: 17/851,475

(22) Filed: Jun. 28, 2022

(65) Prior Publication Data

US 2022/0414235 A1    Dec. 29, 2022

Related U.S. Application Data

(60) Provisional application No. 63/215,848, filed on Jun. 28, 2021.

(51) Int. Cl.
*G06F 21/60* (2013.01)
*G06F 21/62* (2013.01)
*H04L 9/00* (2022.01)

(52) U.S. Cl.
CPC ........ *G06F 21/602* (2013.01); *G06F 21/6245* (2013.01); *H04L 9/008* (2013.01)

(58) Field of Classification Search
CPC ..... G06F 21/602; G06F 21/6245; H04L 9/008
See application file for complete search history.

(56) References Cited

U.S. PATENT DOCUMENTS

| | | | |
|---|---|---|---|
| 10,320,843 B1 | 6/2019 | Dobrek et al. | |
| 10,536,437 B2 | 1/2020 | Bellala et al. | |
| 10,592,687 B2 | 3/2020 | Kapadia et al. | |
| 11,379,913 B1* | 7/2022 | Perelli-Minetti | G06Q 40/03 |
| 2017/0169241 A1* | 6/2017 | Unagami | G09C 1/00 |
| 2020/0228325 A1* | 7/2020 | Fan | G06N 20/00 |
| 2021/0240840 A1* | 8/2021 | Goldsteen | H04L 9/30 |

* cited by examiner

*Primary Examiner* — Thomas J Dailey
(74) *Attorney, Agent, or Firm* — PEARL COHEN ZEDEK LATZER BARATZ LLP (57) ABSTRACT

Methods and system for risk determination and risk categorization using encrypted data are provided. The risk determination can involve determining an inner product operation between a generalized weight table and an encrypted incidence vector, summing the result of the inner product operation and/or decrypting the results. Method and systems for encrypting data for use in homomorphic risk determination are also provided.

10 Claims, 7 Drawing Sheets

SYSTEM AND METHOD FOR SECURELY EVALUATING RISK OVER ENCRYPTED DATA

CROSS REFERENCE TO RELATED APPLICATIONS

The application claims the benefit of and priority to U.S. provisional patent application No. 63/215,848 filed on Jun. 28, 2021, the entire contents of which are owned by the assignee of the instant application and incorporated by reference herein in their entirety.

FIELD OF THE INVENTION

The invention relates to data privacy, security, and encryption of secret data. In particular, the invention relates to quickly and efficiently computing risk scores and risk categorization on secret data without exposing the underlining secret data to an untrusted party.

BACKGROUND OF THE INVENTION

Today, massive amounts of data live in many organizations, with barriers between them, erected by mistrust, economic incentives and regulatory hurdles. When secret data, such as, personal or medical data is involved, privacy may become a major concern for all parties involved, as that information can be used to identify or exploit the individuals.

Standard encryption may garble data. Because encryption may obscure and permute the content and order of the data, computations conventionally are not performed on the encrypted data. To perform operations, the encrypted data may be decrypted at a special designated "trusted hardware" device, where the operations are performed in the unencrypted domain, and the result is re-encrypted. Trusted hardware may be special dedicated hardware, distinct from main memory, that meets security protocol(s), designated to keep it safe from tampering. Trusted hardware is often implemented as a "secure chip" and generally has limited memory and computational capacity, which may render it slow and it may have insufficient storage when large amounts of data and complex computations are involved.

Homomorphic Encryption (HE) cryptosystems have been developed which can obviate the need for special trusted hardware, while still protecting data secrecy. Homomorphic Encryption (HE) cryptosystems may allow untrusted parties to perform computations on encrypted data (i.e., ciphertexts) in an encrypted domain. Homomorphic Encryption (HE) cryptosystems may allow a third party to evaluate computations on encrypted data without learning anything about the data, such that only the legitimate recipient of the homomorphic calculation will be able to decrypt the data using the recipient's secret key.

Although HE can theoretically work on any data, HE may be extremely slow because the source data may be encrypted in a representation significantly larger than the source data, so many more operations may need to be performed to support computations on encrypted data than the source data. In practice, HE may be unrealistic to use in some real-world settings, especially when large amounts of data and complex computations are involved.

By way of example, currently, a medical care provider may generate privacy sensitive data, such as measurements of a patient's blood chemistry, and the medical care provider may wish to obtain an indication of the risk associated with the cardiovascular health of the patient, for example, how likely the patient is to experience complications due to cardiovascular causes. It can be desired to keep privacy sensitive data private.

Accordingly, it may be desirable to compute risk scores and perform risk categorization on secret data without exposing the underlining secret data to an untrusted party. It may also be desirable to compute the risk scores and perform risk categorization in a fast and efficient manner. For example, in real-time such that the results can be used in intensive care unit triage.

There may additionally or alternatively be a need in the art for techniques to compute scores and perform categorization for a variable other than risk, without exposing underlining secret data to an untrusted party.

SUMMARY OF EMBODIMENTS OF THE INVENTION

Advantages of the invention can include an ability to compute risk score and/or perform risk categorization on private data in a secure manner Another advantage of the invention can include performing computer secure risk score and risk categorization in real-time (or substantially in real-time) such that the results can be used immediately, for example, in an intensive care unit triage, emergency room, and/or any setting where the results are needed in real-time.

In one aspect, the invention involves a method for risk determination using encrypted data, wherein the method involves receiving, by a computing device, the encrypted data, wherein the encrypted data comprises at least one encrypted incidence vector. The method can also involve receiving, by the computing device, a generalized weight table for each encrypted incidence vector. The method can also involve determining, by the computing device, an inner product operation between each generalized weight table and each encrypted incidence vector to obtain at least one encrypted inner product. The method can also involve summing, by the computing device, the at least one encrypted inner product. The method can also involve transmitting, by the computing device, the summed at least one encrypted inner product to an application to be used as the basis for a risk score.

In some embodiments, the encrypted data is privacy sensitive data, measured data, or both.

In some embodiments, the summed at least one encrypted inner product is an encrypted risk score.

In some embodiments, the generalized weight table has a length based on an application type of the application sending the encrypted data, a user input or both.

In another aspect, the invention involves a method for encrypting data for use in homomorphic risk determination. The method can involve generating, by a computing device, at least one encryption key; at least one of generating or receiving data, by the computing device. The method can involve determining, by the computing device, a range, precision or both for the data. The method can involve mapping, by the computing device, the range for the data to an integer set. The method can involve encoding, by the computing device, each data point in the data to a specific integer in the integer set. The method can involve encoding, by the computing device, the encoded data points on an incidence vector. The method can involve encrypting, by the computing device, the incidence vector using the at least one encryption key. The method can involve transmitting, by the computing device, the encrypted incidence vector to an application to be used as the basis for risk determination.

In some embodiments, the data is privacy sensitive data, measured data, or both.

In some embodiments, the incidence vector is plaintext.

In some embodiments, the incidence vector has a length that is based on a type of the data.

In another aspect, the invention involves a method for risk categorization using encrypted data. The method can involve receiving, by a computing device, the encrypted data, wherein the encrypted data comprises at least one encrypted risk score incidence vector. The method can involve receiving, by the computing device, a generalized weight table for each encrypted risk score incidence vector. The method can involve determining, by the computing device, an inner product operation between the generalized weight table and the encrypted risk score incidence vector to obtain an encrypted risk categorization. The method can involve transmitting, by the computing device, the encrypted risk categorization to an application.

In some embodiments, the encrypted data is privacy sensitive data, measured data, or both.

In some embodiments, the generalized weight table has a length based on an application type of the application sending the encrypted data, a user input or both.

In another aspect, the invention involves a method for encrypting data for use in homomorphic risk categorization. The method can involve generating, by a computing device, at least one encryption key. The method can involve at least one of generating or receiving a plurality of risk scores, by the computing device. The method can involve determining, by the computing device, a range, precision or both for the plurality of risk scores. The method can involve mapping, by the computing device, the range for the plurality of risk scores to an integer set. The method can involve encoding, by the computing device, each risk score in the plurality of risk scores to a specific integer in the integer set. The method can involve encoding, by the computing device, the encoded risk scores on an incidence vector. The method can involve encrypting, by the computing device, the incidence vector using the at least one encryption key. The method can involve transmitting, by the computing device, the encrypted incidence vector to an application to be used as the basis for risk determination.

In some embodiments, the risk scores are privacy sensitive, measured, or both.

In some embodiments, the incidence vector is plaintext.

In some embodiments, the incidence vector has a length that is based on a type of the data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Figure 1:
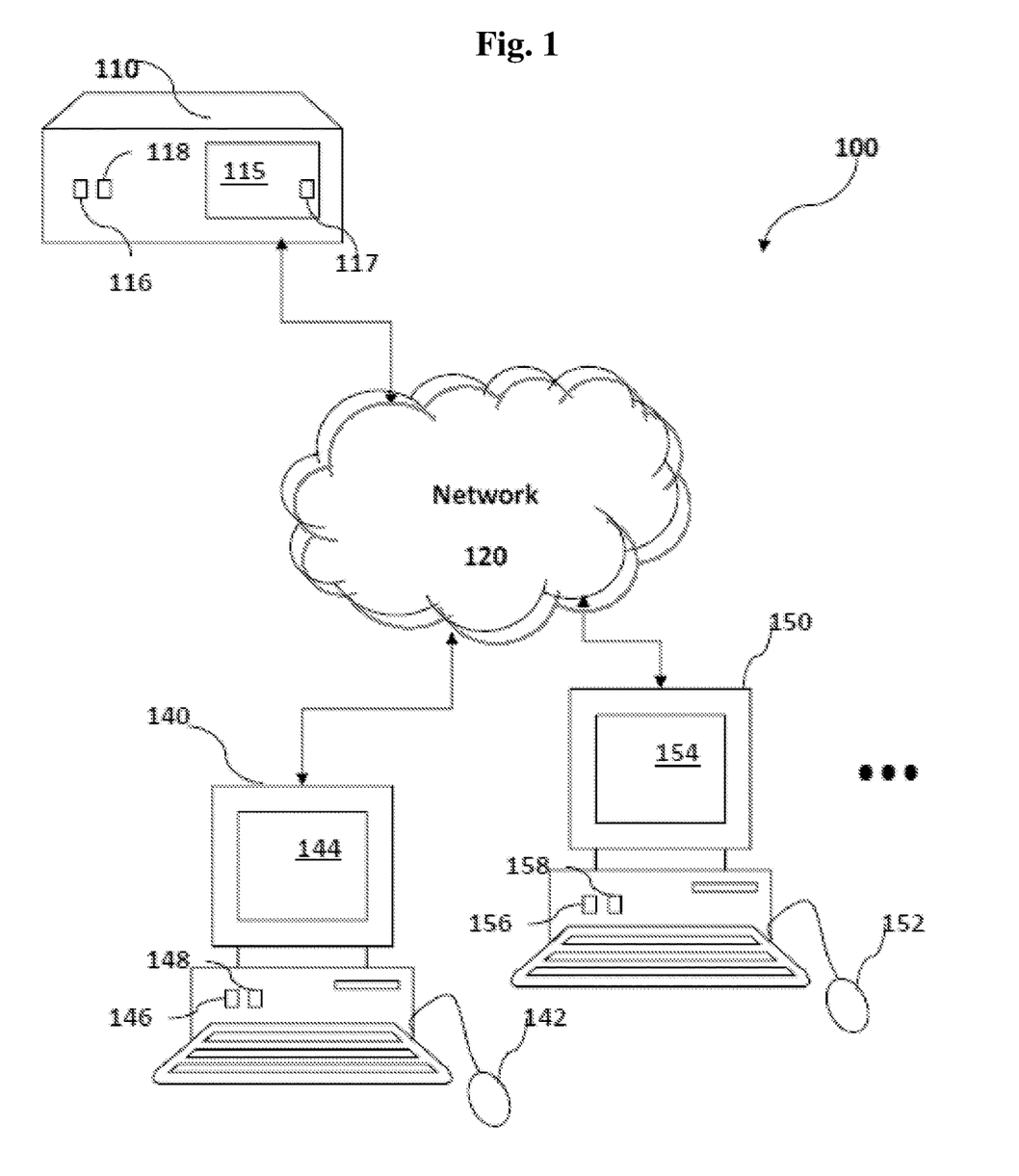
FIG. 1 is a schematic drawing of a system for risk determination, according to some embodiments of the invention.

FIG. 1 is a schematic drawing of a system 100 according to some embodiments of the invention. System 100 may include one or more server(s) 110, database(s) 115, and/or computer(s) 140, 150, . . . , etc. Any or all of system 100 devices may be connected via one or more network(s) 120. Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random-access memory (RAM), a dynamic RAM (DRAM), a flash memory, a volatile memory, a non-volatile memory, a cache memory, a buffer, a short term memory unit, a long term memory unit, or other suitable memory units or storage units.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Database 115 may include software processes or applications for storing and retrieving data 117 such as large-word data structures and large-work CKKS computations, and/or encryption and/or decryption keys. Data 117 may also include code (e.g., software code) or logic, e.g., to enable the application of large-work CKKS algorithms according to embodiments of the invention. Database 115 may be internal or external to one or more of server(s) 110 and/or computer(s) 140 and/or 150 (not shown) and may be connected thereto by a local or remote and a wired or wireless connection. In some embodiments, data 117 is stored in an alternate location separate from database 115, e.g., memory unit(s) 118, 148, and/or 158.

Any of system 100 devices may operate as a secure or insecure party. Secure parties may each securely store unencrypted (or encrypted) data and private keys associated with each dataset, party, etc. Insecure parties may not access the unencrypted data or private keys.

Figure 2:
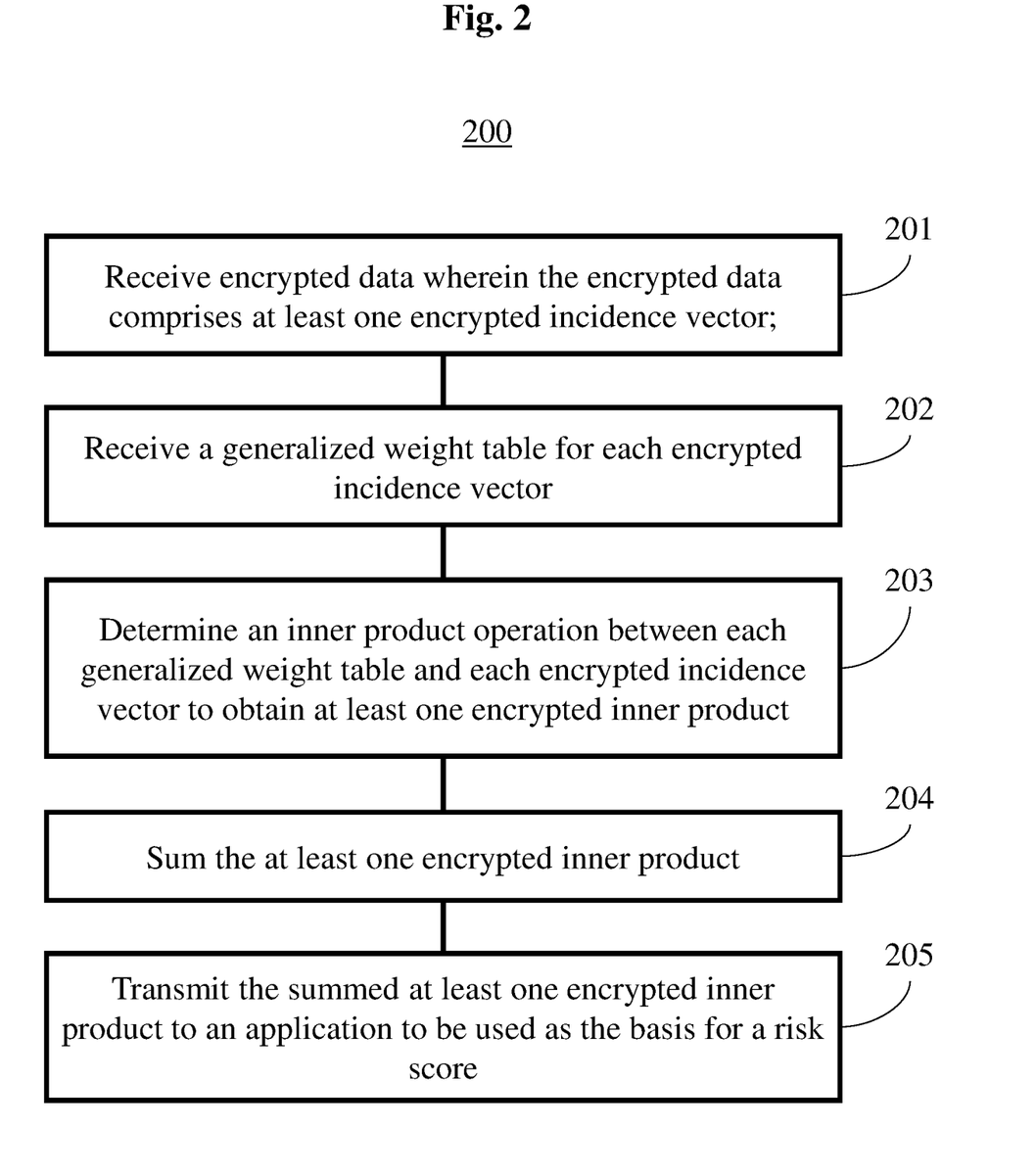
FIG. 2 is a flowchart for a method for risk determination using encrypted data, according to some embodiments of the invention.

FIG. 2 shows a flowchart of a method 200 for risk determination using encrypted data, according to some embodiments of the invention.

The method may involve receiving (e.g., via a computing device 140 or 150 as shown above in FIG. 1), the encrypted data, wherein the encrypted data comprises at least one encrypted incidence vector (Step 201). In some embodiments, a plurality of encrypted incident vectors is received.

The encrypted data may be DES, AES, RSA, Twofish, Blowfish, and Threefish, and/or any type of encrypted data as is known in the art. Encrypting data may involve converting information in a plaintext representation into a ciphertext representation.

In some embodiments, a public key is received. The public key may be associated with a secret key that is not received. The public key may be an encryption key which was used to encrypt the encrypted data.

The incidence vector may include data which is indicative of an occurrence of data point within specific ranges of data.

The method may also involve receiving (e.g., via a computing device 140 or 150 as shown above in FIG. 1) a generalized weight table for each encrypted incidence vector (Step 202).

The generalized weight table may be based on a weight table. The weight table can be input by a user. The weight table may be a table in which each entry is a weight that may be indicative of a risk associated with the corresponding entry of an incidence vector. In some embodiments, a weight may be indicative of any other value or cost associated with the corresponding entry of an incidence vector, for example, a cost of obtaining or using the information of the corresponding entry. A weight table/weights may be determined/generated using machine learning techniques and/or optimization techniques (e.g., via a computing device 140 or 150 as shown above in FIG. 1). The generalized weight table may be constructed from the weight table based upon an integer set or range. The integer set or range may in some embodiments be in agreement with the integer set or range of method 300 as described below in FIG. 3.

For example, assume a weight table with 6 entries over some range and an integer set with 12 entries over the same range. In such an example, generating the generalized weight table may use a process of extrapolation to increase the table size to 12. In some embodiments, multiple weight tables may be generated or received corresponding to multiple incidence vectors. In some embodiments, multiple with tables can be generated based on multiple incident vectors which may correspond to multiple data types.

The method may also involve determining (e.g., via computing device 140 or 150 as described above in FIG. 1) an inner product operation between each generalized weight table and each encrypted incidence vector to obtain at least one encrypted inner product (Step 203).

The inner product operation can involve taking two vectors and returning a single number which is the sum of the products of the $i^{th}$ component of one vector and the $i^{th}$ component of the other vector for all i, where i is an integer value>0.

The inner product operation may need to be modified or replaced in order to allow for encrypted vectors to be used in the operation. The inner product operation may thus be an "evaluation mult" operation, or any other suitable alternative, as may be known in the art of homomorphic encryption operations. In embodiments, in which there are multiple incidence vectors and/or multiple weight tables, multiple inner product operations may be carried out to obtain multiple encrypted inner products.

The method may also involve summing (e.g., via computing device 140 or 150 as described above in FIG. 1) the at least one encrypted inner product (Step 204).

The sum operation may be modified or replaced in order to allow for encrypted values to be used in the operation. The sum operation may thus be an "evaluation add" operation, or any other suitable alternative, as may be known in the art of homomorphic encryption operations.

In some embodiments, step 204 may be skipped. For example, in the case that only one encrypted incidence vector is received, and only one encrypted inner product is determined, step 204 may not be necessary.

The method may also involve transmitting (e.g., via computing device 140 or 150 as described above in FIG. 1) the summed at least one encrypted inner product to an application to be used as the basis for a risk score (Step 205). The summed at least one encrypted inner product can be decrypted to obtain the risk score.

The application may decrypt the encrypted inner product to obtain a risk score. The application may, for example, use risk scores in risk analysis. In a medical setting, for example, risk scores may be used for triage.

Figure 3:
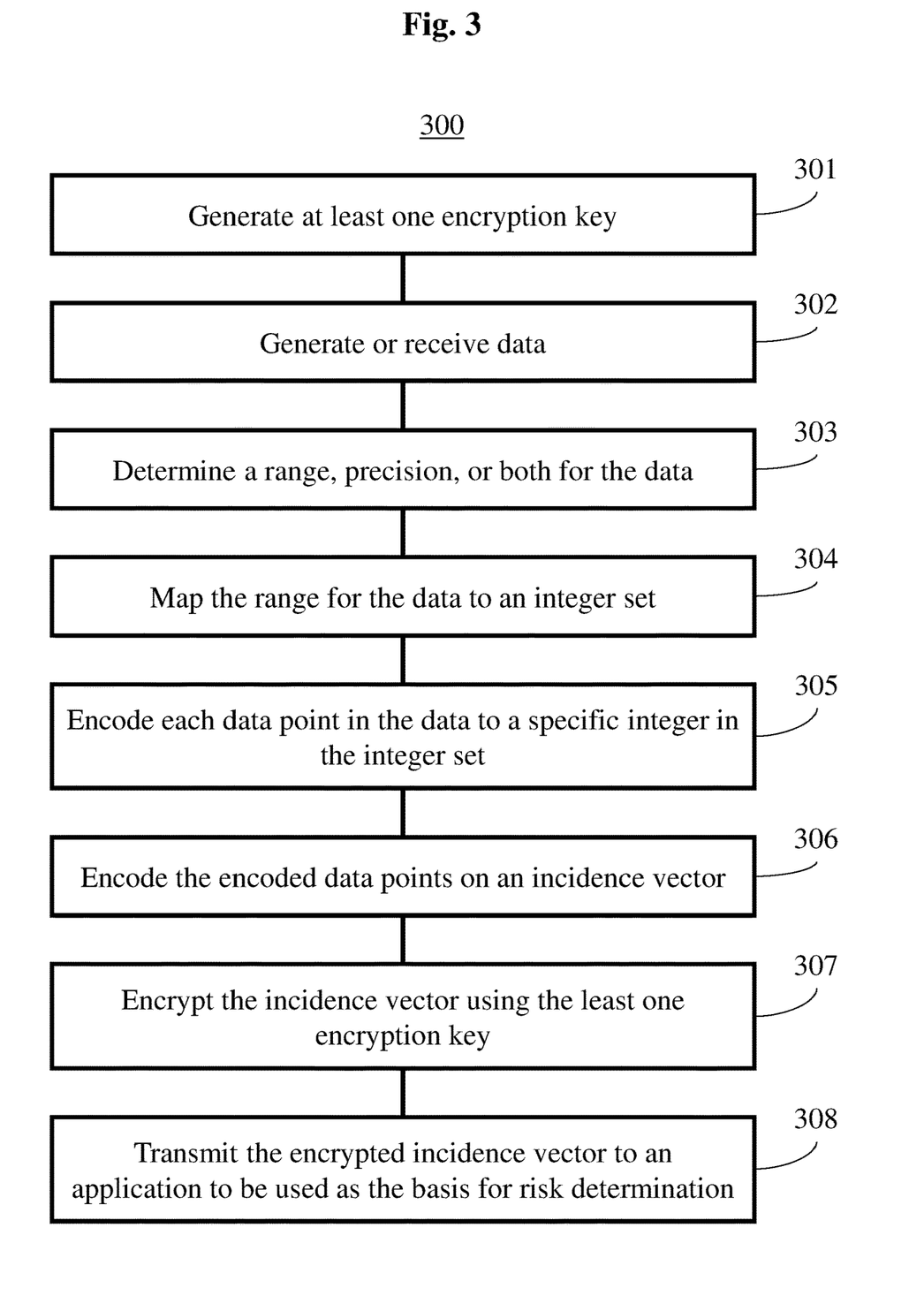
FIG. 3 is a flowchart for a method encrypting data for use in homomorphic risk determination, according to some embodiments of the invention.

FIG. 3 s is a flowchart for a method 300 encrypting data for use in homomorphic risk determination according to some embodiments of the invention.

The method can involve generating (e.g., via the computing device 140 or 150 as shown above in FIG. 1) at least one encryption key (Step 301).

The encrypted key may comply with DES, AES, RSA, Twofish, Blowfish, and Threefish, and/or any type of encryption as is known in the art. The at least one encryption key may allow for the conversion of information in a plaintext representation into a ciphertext representation.

In some embodiments, a secret encryption key and a corresponding public encryption key is generated.

The method can involve generating and/or receiving (e.g., via the computing device 140 or 150 as shown above in FIG. 1) data (Step 302). The data may be privacy sensitive data, for example, medical data (e.g., risk of surgical complications) or financial data (e.g., risk of debt default). The data may be measured data. The data may be numerical data. Multiple data instances may be generated. Said multiple data instances may relate to the same data type. For example, one medical patient may have various data points (e.g., weight, blood pressure, hemoglobin count, etc.), which may be related to surgical complication risk.

The data may relate to any process. The data may relate to a process in which some data readings relate to a higher risk than other data readings.

The method can involve determining (e.g., via the computing device 140 or 150 as shown above in FIG. 1) a range, precision, or both for the data (Step 303).

The range and/or precision may be the actual range and/or actual precision of the data itself. The range and/or precision may be based on an analysis of what the data represents or a problem to be solved. For example, assume that the data represents human ages in the context of health risk analysis for a particular condition, a range of 0-130 years may be chosen because age-related data falls within this range, and it may be decided that in the context of the problem, a precision of 5 years is sufficient because every 5 years a person's risk for the particular condition changes. In some embodiments, multiple ranges and/or precisions may be determined in the case that there are multiple data points of different types, such that each range/precision corresponds to a data point (e.g., a range for age may be 0-130 years and a range for weight may be 0-250 kg).

The method can involve mapping (e.g., via the computing device 140 or 150 as shown above in FIG. 1) the range for the data to an integer set (Step 304). The integer set may be based on the precision. The integer set may be any fully ordered set.

Mapping may involve creating an integer set that is suitably long for all possible values within the range (possibly given the precision). For example, given the previous example of data representing human ages in the context of health risk analysis, where the range is 0-130 and the precision is 5, a corresponding integer set length can be 26 digits long (e.g., integer set may be represented as [0, 1, 2, ... 25, 26]). In some embodiments having multiple ranges and/or precisions, these may be mapped to multiple corresponding integer sets.

The method can involve encoding (e.g., via the computing device 140 or 150 as shown above in FIG. 1) each data point in the data to a specific integer in the integer set. In some embodiments, encoding involves encoding each data point in the data to a specific range, as represented by an integer in the integer set (Step 305). For example, for an integer set of [0, 1, 2, 3, 4, 5], wherein each entry in the integer set represents a specific range of 0 kg-10 kg, 10 kg-20 kg, 20 kg-30 kg, 30 kg-40 kg, 40 kg-50 kg, and 50 kg-60 kg respectively, and wherein a specific data point is given as 37.2 kg, step 305 may associate/encode the data point with integer 3 of the integer set. In some embodiments, this process may be repeated multiple times for multiple data sets/points to multiple integer sets to which they correspond.

The method can involve encoding (e.g., via the computing device 140 or 150 as shown above in FIG. 1) the encoded data points on an incidence vector (e.g., indicator vector or characteristic vector) (Step 306). The incidence vector may be a vector with one element for each element in the integer set (e.g., incidence vector and integer set may be of the same length), wherein an element in the incidence vector may be one if a corresponding data point has been encoding into the same element of the integer set and may be a zero if not. The incidence vector may be a vector consisting of only ones and zeros.

The method can involve encrypting (e.g., via the computing device 140 or 150 as shown above in FIG. 1) the incidence vector using the at least one encryption key. Encrypting may convert data in a plaintext representation into a ciphertext representation (Step 307). Encrypting may result in an encrypted incidence vector (which may be a ciphertext). In the case of multiple incidence vectors, each incidence vector may be encrypted separately.

The method can involve transmitting (e.g., via the computing device 140 or 150 as shown above in FIG. 1) the encrypted incidents vector to an application to be used as the basis for risk determination (Step 308).

Figure 4:
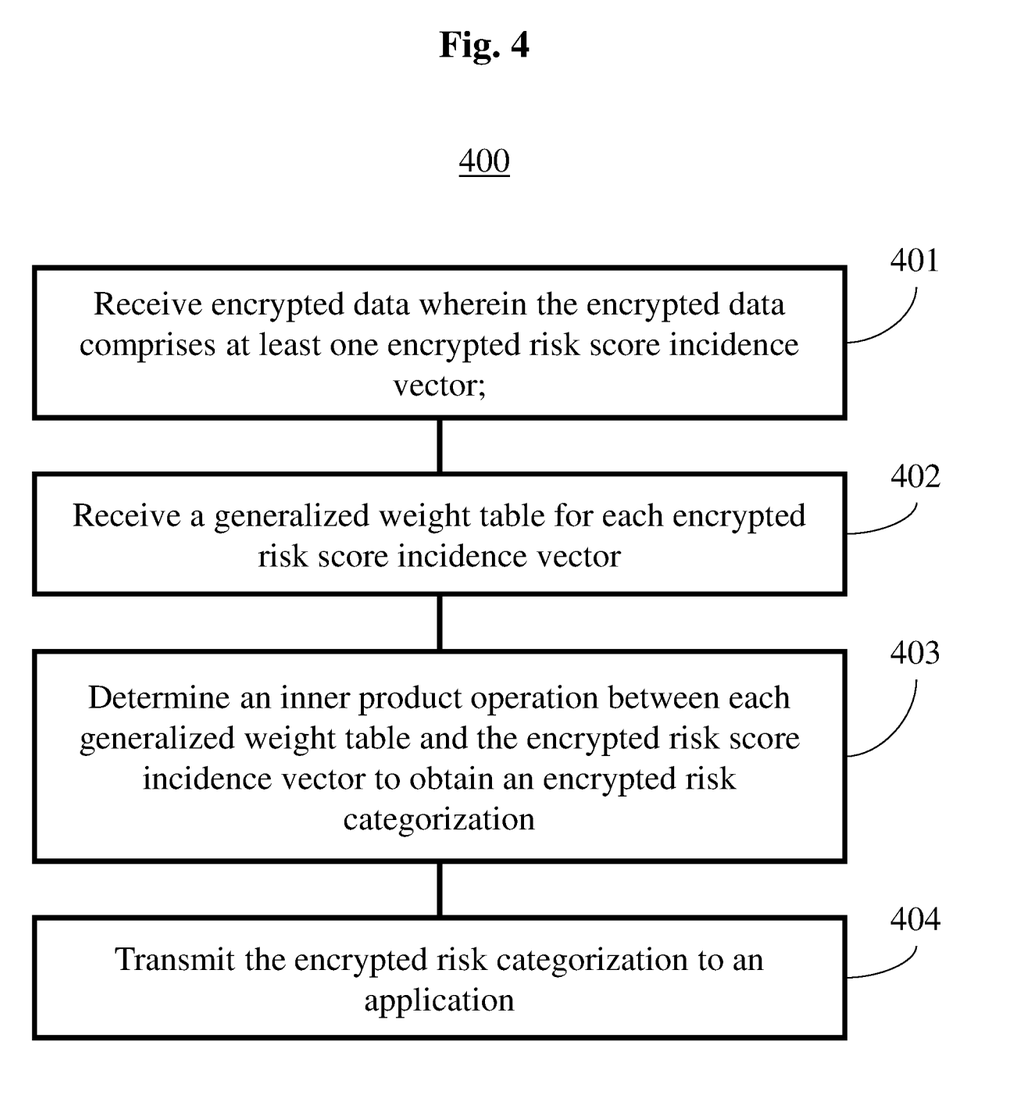
FIG. 4 is a flowchart for a method for risk categorization using encrypted data according to some embodiments of the invention.

FIG. 4 is a flowchart 400 for a method for risk categorization using encrypted data according to some embodiments of the invention.

The method can involve receiving (e.g., via the computing device 140 or 150 as shown above in FIG. 1) encrypted data including at least one encrypted risk score incidence vector (Step 401). In some embodiments, a plurality of encrypted risk score incidence vectors is received.

The encrypted data may be DES, AES, RSA, Twofish, Blowfish, and Threefish, and/or any type of encrypted data as is known in the art. Encrypting data may involve converting information in a plaintext representation into a ciphertext representation.

In some embodiments, a public key is received. The public key may be associated with a secret key that is not received. The public key may be an encryption key which was used to encrypt the encrypted data.

An incidence vector/risk score incidence vector may be a vector which holds data which is indicative of an occurrence of data point within specific ranges of data and/or which holds data which is indicative of the occurrence of a risk score within a range.

The method may also involve receiving (e.g., via a computing device 140 or 150 as shown above in FIG. 1) a generalized weight table for each encrypted risk score incidence vector (Step 402).

The generalized weight table may be based on a weight table. The weight table can be input by a user. The weight table may be a table in which each entry is a weight that may be indicative of a risk associated with the corresponding entry of a risk score incidence vector. In various embodiments, a weight is indicative of any other value or cost associated with the corresponding entry of an incidence vector, for example, a cost of obtaining or using the information of the corresponding entry. Each weight may include a string indicating risk, for example, "low", "medium", and "high". A weight table/weights may be determined/generated using machine learning techniques and/or optimization techniques (e.g., via a computing device 140 or 150 as shown above in FIG. 1). The generalized weight table may be constructed from the weight table based upon an integer set or range. The integer set or range may in some embodiments be in agreement with the integer set or range of method 500 as described below in FIG. 5.

For example, an inputted weight table may have 6 entries over some range and an integer set may require 12 entries over the same range. In such an example, generating the generalized weight table may use a process of extrapolation to increase the table size to 12. In some embodiments, multiple weight tables may be generated or received corresponding to multiple incidence risk score vectors (which may correspond to multiple data types).

The method may also involve determining (e.g., via computing device 140 or 150 as described above in FIG. 1) an inner product operation between each generalized weight table and the encrypted risk score incidence vector to obtain an encrypted risk categorization (Step 403).

The inner product may involve taking two vectors and returning a single number which is the sum of the products of the $i^{th}$ component of one vector and the $i^{th}$ component of the other vector for all i is an integer value>0. The inner product operation may need to be modified or replaced in order to allow for encrypted vectors to be used in the operation. The inner product operation may thus be an "evaluation mult" operation, or any other suitable alternative, as may be known in the art of homomorphic encryption operations. In embodiments, in which there are multiple incidence vectors and/or multiple weight tables, multiple inner product operations may be carried out to obtain multiple encrypted inner products.

The method may also involve transmitting (e.g., via computing device 140 or 150 as described above in FIG. 1) the encrypted risk categorization to an application. The application may decrypt the encrypted inner product to obtain a risk score. The application may, for example, use risk scores in risk analysis. In a medical setting, for example, risk scores may be used for triage.

Figure 5:
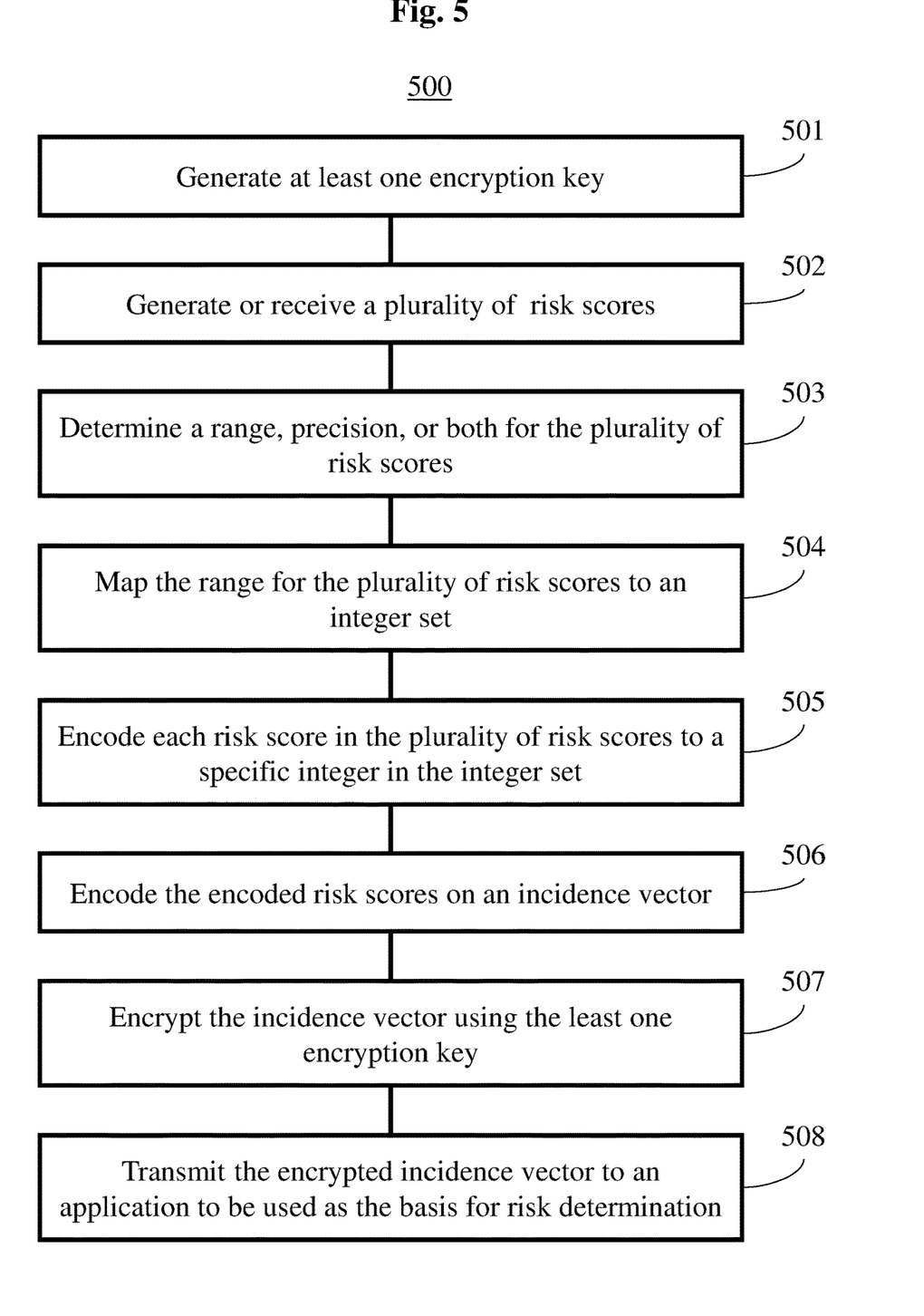
FIG. 5 is a flowchart for a method for encrypting data for use in homomorphic risk categorization according to some embodiments of the invention.

FIG. 5 is a flowchart for a method 500 for encrypting data for use in homomorphic risk categorization according to some embodiments of the invention.

The method may involve generating (e.g., via the computing device 140 or 150 as shown above in FIG. 1) at least one encryption key (Step 501).

The encrypted key may comply with DES, AES, RSA, Twofish, Blowfish, and Threefish, and/or any type of encryption as is known in the art. The at least one encryption key may allow for the conversion of information in a plaintext representation into a ciphertext representation.

In some embodiments, a secret encryption key and a corresponding public encryption key is generated.

The method can involve generating or receiving (e.g., via the computing device 140 or 150 as shown above in FIG. 1) a plurality of a risk scores (Step 502). The risk scores relate to privacy sensitive data, for example, medical data (e.g., risk of surgical complications) or financial data (e.g., risk of debt default). The risk scores may relate to measured data. The risk scores may be numerical data. Multiple risk score instances may be generated. Said multiple risk scores instances may relate to the same data type. For example, one medical patient may have various data points (e.g., weight, blood pressure, hemoglobin count, etc.), which may be related to surgical complication risk.

The method can involve determining (e.g., via the computing device 140 or 150 as shown above in FIG. 1) a range, precision, or both for the plurality of risk scores (Step 502). The range and/or precision may be based on the actual range and/or actual precision of the data itself. The range and/or precision may be based on an analysis of how the risk scores are calculated or defined.

For example, in the case that it is known that a risk score is graded between 0 and 10, then the range may also be defined as 0-10. In the case that it is known that risk scores are given to a precision of one decimal place, this may be determined as the precision. In other embodiments, such a precision may be deemed unnecessary, and a larger precision value may be used. In some embodiments, multiple ranges and/or precisions may be determined in the case that there are multiple risk scores of different types, such that each range/precision corresponds to a specific risk score.

The method can involve mapping (e.g., via the computing device 140 or 150 as shown above in FIG. 1) the range for the plurality of risk scores to an integer set (Step 504). The integer set may be based on the precision. The integer set may be any fully ordered set.

Mapping may involve creating an integer set that is suitably long for all possible values within the range (possibly given the precision). For example, given the previous example of risk scores in a range of 0-10, and where the precision is 0.1, a corresponding integer set length which is 100 (or possibly 101) digits long (i.e., integer set may be represented as [0.0, 0.1, 0.2, . . . 9.9, 10.0]). In some embodiments with multiple ranges and/or precisions, these ranges and/or precisions may be mapped to multiple corresponding integer sets.

The method can involve encoding (e.g., via the computing device 140 or 150 as shown above in FIG. 1) each risk score in the plurality of risk scores to a specific integer in the integer set (Step 505). In some embodiments, encoding involves encoding each risk score in the plurality of risk scores to a specific range, as represented by an integer in the integer set. For example, for an integer set of [0, 1, 2, 3, 4, 5], wherein each entry in the integer set represents a specific range of 0-2, 2-4, 4-6, 6-8, 8-12, 12-20 respectively, and wherein a specific risk score is given as 9, step 505 may associate/encode the risk score with integer 4 of the integer set. In some embodiments, this process may be repeated multiple times for multiple risk scores to multiple integer sets to which they correspond.

The method can involve encoding (e.g., via the computing device 140 or 150 as shown above in FIG. 1) the encoded risk scores on an incidence vector/risk score incidence vector (Step 506). The incidence vector/risk score incidence vector may be a vector with one element for each element in the integer set (e.g., incidence vector/risk score incidence vector and integer set may be of the same length), wherein an element in the incidence vector/risk score incidence vector may be one if a corresponding data point has been encoding into the same element of the integer set and may be a zero if not. The incidence vector/risk score incidence vector may be a vector consisting of only ones and zeros.

The method can involve encrypting (e.g., via the computing device 140 or 150 as shown above in FIG. 1) the incidence vector using the at least one encryption key (Step 507). Encrypting may result in an encrypted incidence vector/risk score incidence vector (which may be a ciphertext). In the case of multiple incidence vectors/risk score incidence vector, each incidence vector/risk score incidence vector may be encrypted separately.

The method can involve transmitting (e.g., via the computing device 140 or 150 as shown above in FIG. 1) the encrypted incidence vector/encrypted risk score incidence vector to an application to be used as the basis for risk determination (Step 508).

Figure 6:
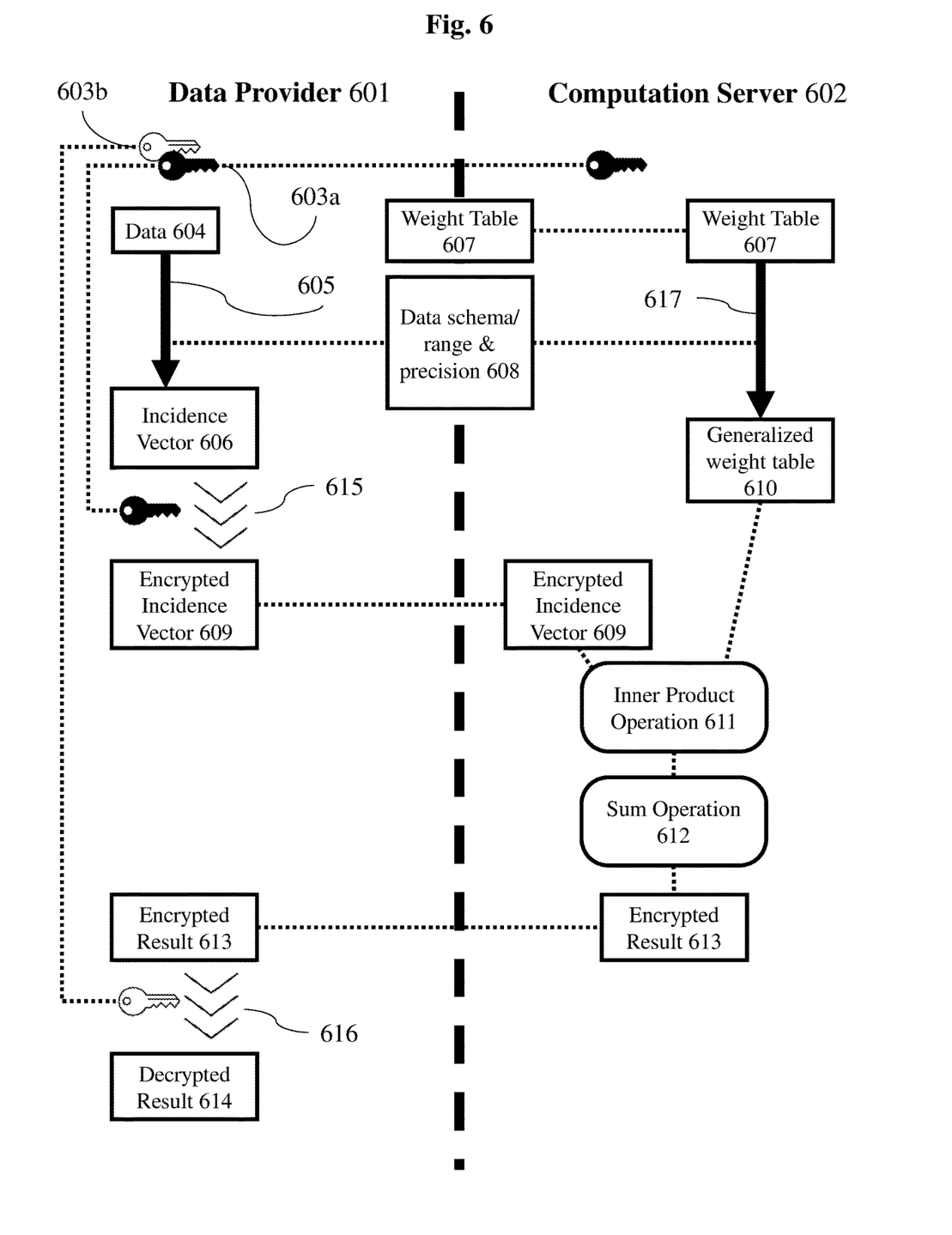
FIG. 6 shows a data flow through an example system, according to some embodiments the invention.

FIG. 6 shows a data flow through an example system, according to some embodiments the invention. The example system as depicted in FIG. 6 includes a data provider 601 and a computation server 602. The data provider 601 and the computation server 602 may be any suitable computational device, such as server(s) 110 and computers 140 and 150 of FIG. 1 and/or computing device 100A of FIG. 7.

The thick vertical dashed line in FIG. 6 may symbolize the separation between the data provider 601 and the computation server 602. In some embodiments, the data provider 601 may be configured to perform method 300 and/or method 500. In some embodiments, the computational server 602 may be configured to perform method 200 and/or method 400. The data provider 601 may generate, retrieve, or receive a public key (603*a*)—secret key (603*b*) pair. In some embodiments the public key may be transferred to the computation server. In some embodiments, the public key is used to support computation in the computation server.

In some embodiments, data may go through a computational process 605 to convert the data into at least one incidence vector 606, based on a data schema/range and/or precision 608 that is shared between the data provider 601 and the computation server 602. In some embodiments, computational process 605 may be any combination of method steps 304, 305, 306, 504, 505, and 506 (e.g., 304, 305 and 306). In some embodiments, the incidence vector 606 is encrypted 615, using public key 603*a* to obtain encrypted incidence vector 609. The encrypted incidence vector may be transmitted by suitable means to the computation server 602.

In some embodiments, the data provider and the computation server may share weight table 607 by any suitable means (e.g., the data provider sends a weight table to the computational server). In some embodiments, the weight table 607 may be converted into a generalized weight table 610, by process 617, based on the shared data schema/range and/or precision 608. In some embodiments, computational process 607 may incorporate method steps 202 and/or 402.

In some embodiments, generalized weight table 610 (which in some non-limiting embodiments is encrypted with the public key) and encrypted incidence vector 609 are used as inputs in an inner product operation 611. Inner product operation may comprise method steps 203 and/or 403. The result(s) of the inner product operation may, in some embodiments, for example, if there are a plurality of inner product results, be summed in sum operation 612. Sum operation 612 may be as described in method step 204. The outcome of processes 611 and/or 612 may be an encrypted result 613.

In some embodiments, encrypted result 613 may be transferred to the data provider 601. The encrypted result 613 may be decrypted 616 (e.g., in the data provider) using secret key 603*b* to give a decrypted result 614. The decrypted result 614 may, for example, be a risk score or risk categorization.

Figure 7:
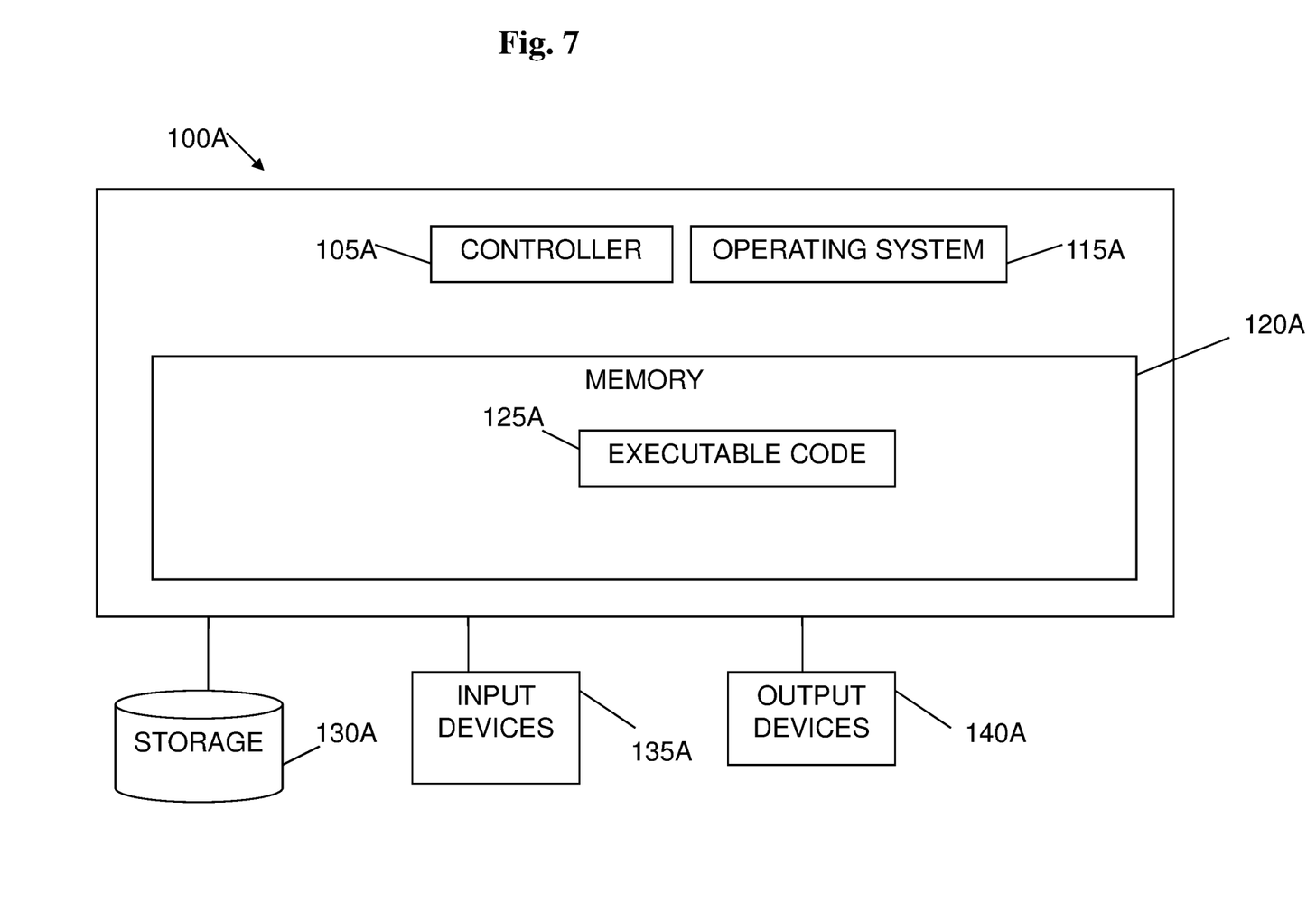
FIG. 7 shows a block diagram of an example computing device which may be used with embodiments of the present invention.

FIG. 7 shows a block diagram of an example computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a Random Access Memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g., code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as a machine learning model, or a process providing input to a machine learning model. In some embodiments, more than one computing device 100A or components of device 100A may be used. One or more processor(s) 105A may be configured to carry out embodiments of the present invention by for example executing software or code. Processor 105A may be a 128-bit processor.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

The invention claimed is:

1. A method for secure risk determination, the method comprising:
   receiving, by a computing device, over a network from a second computing device, encrypted data comprising a plurality of encrypted incidence vectors each of which encrypts one or more plaintext encodings of one or more respective value ranges containing one or more respective privacy sensitive measurements;
   receiving, by the computing device, a generalized weight table for each encrypted incidence vector, wherein each entry of the generalized weight table is a weight that indicates a risk associated with a corresponding entry of the encrypted incidence vector;
   determining, by the computing device, an inner product operation between each generalized weight table and each of the plurality of encrypted incidence vectors to obtain a plurality of encrypted inner products;
   summing, by the computing device, the plurality of encrypted inner products to obtain an encrypted risk score; and
   transmitting, by the computing device, the summed plurality of encrypted inner products over the network to the second computing device indicating the encrypted risk score associated with the one or more privacy sensitive measurements without exposing the underlining privacy sensitive measurements to the computing device.

2. The method of claim 1 wherein the generalized weight table has a length based on an application type of an application sending the encrypted data, a user input or both.

3. A method for secure risk categorization, the method comprising:
   receiving, by a computing device, over a network from a second computing device, encrypted data comprising at least one encrypted risk score incidence vector which encrypts one or more plaintext encodings of one or more respective value ranges containing one or more respective risk scores;
   receiving, by the computing device, a generalized weight table for each encrypted risk score incidence vector, wherein each entry of the generalized weight table is a weight that indicates a risk associated with a corresponding entry of the encrypted risk score incidence vector;
   determining, by the computing device, an inner product operation between the generalized weight table and the encrypted risk score incidence vector to obtain an encrypted risk categorization; and
   transmitting, by the computing device, the encrypted risk categorization over a network to the second computing device.

4. The method of claim 3 wherein the encrypted data is privacy sensitive data, measured data, or both.

5. The method of claim 3 wherein the generalized weight table has a length based on an application type of an application sending the encrypted data, a user input or both.

6. A computing device for secure risk determination, the computing device comprising:
   one or more memories configured to store encrypted data comprising a plurality of encrypted incidence vectors each of which encrypts one or more plaintext encodings of one or more respective value ranges containing one or more respective privacy sensitive measurements; and
   one or more processors configured to:
      receive the encrypted data over a network from a second computing device,
      receive a generalized weight table for each encrypted incidence vector, wherein each entry of the generalized weight table is a weight that indicates a risk associated with a corresponding entry of the encrypted incidence vector,
      determine an inner product operation between each generalized weight table and each of the plurality of encrypted incidence vectors to obtain a plurality of encrypted inner products,
      sum the plurality of encrypted inner products to obtain an encrypted risk score, and
      transmit the summed plurality of encrypted inner products over the network to the second computing device indicating the encrypted risk score associated with the one or more privacy sensitive measurements without exposing the underlining privacy sensitive measurements in the computing device.

7. The computing device of claim 6, wherein the generalized weight table has a length based on an application type of an application sending the encrypted data, a user input or both.

8. A computing device for secure risk categorization, the computing device comprising:
   one or more memories configured to store encrypted data comprising at least one encrypted risk score incidence vector which encrypts one or more plaintext encodings of one or more respective value ranges containing one or more respective risk scores; and
   one or more processors configured to:
      receive the encrypted data over a network from a second computing device,
      receive a generalized weight table for each encrypted risk score incidence vector, wherein each entry of the generalized weight table is a weight that indicates a risk associated with a corresponding entry of the encrypted risk score incidence vector,
      determine an inner product operation between the generalized weight table and the encrypted risk score incidence vector to obtain an encrypted risk categorization, and
      transmit the encrypted risk categorization over the network to the second computing device.

9. The computing device of claim 8, wherein the encrypted data is privacy sensitive data, measured data, or both.

10. The computing device of claim 8, wherein the generalized weight table has a length based on an application type of an application sending the encrypted data, a user input or both.

* * * * *